(No Model.)
O. F. GILBERT.
TRACTION WHEEL.
No. 275,035. Patented Apr. 3, 1883.
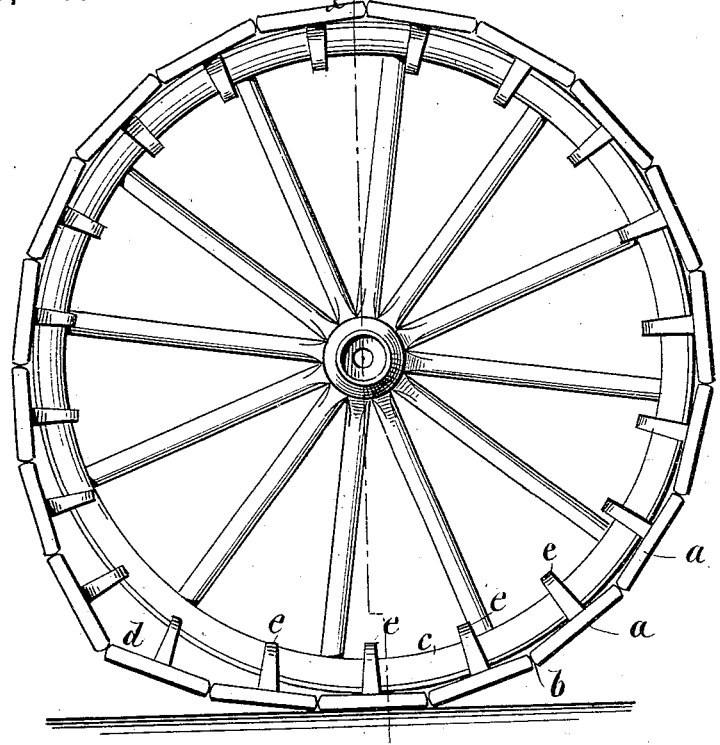
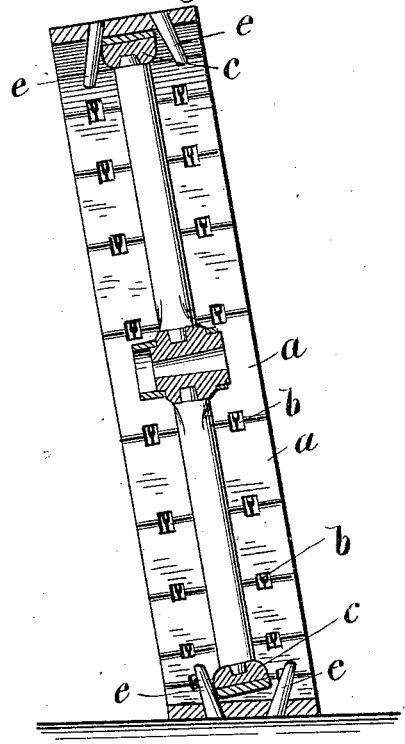
WITNESSES:
INVENTOR:
O. F. Gilbert
BY Munn & Co.
ATTORNEYS.

UNITED STATES PATENT OFFICE.

OLIVER F. GILBERT, OF JAMESTOWN, DAKOTA TERRITORY.

TRACTION-WHEEL.

SPECIFICATION forming part of Letters Patent No. 275,035, dated April 3, 1883.

Application filed December 21, 1882. (No model.)

*To all whom it may concern:*

Be it known that I, OLIVER F. GILBERT, of Jamestown, in the county of Stutsman and Territory of Dakota, have invented a new and Improved Endless-Track-Wheel Rim, of which the following is a full, clear, and exact description.

My invention consists of an improved construction of endless-track-wheel rims for application to wagon and traction-engine wheels, when being used on soft ground or roads, to prevent the wheels from sinking in the ground, the said improved construction being a series of planks linked together in endless form and in suitably-greater length than the length of the rim of the wheel to enable the planks to drop flat on the ground before the wheel passes onto them, the said planks having prongs which straddle the rim of the wheel to keep them on the rim, and at the same time to allow the requisite movement of the planks relatively to the rim for enabling them to so drop on the ground in advance of the rim, and also to allow the planks to lie flat on ground sloping sidewise to the wheel, all as hereinafter fully described.

Reference is to be had to the accompanying drawings, forming part of this specification, in which similar letters of reference indicate corresponding parts in both the figures.

Figure 1 is a side elevation of a wheel with my improved endless-track rim applied to it, and Fig. 2 is a transverse section of Fig. 1 on line *x x*.

I make an endless chain of track plates or planks, *a*, of any approved length and breadth, by jointing them together with eye studs or staples *b*, making the chain as much longer than the rim *c* of the wheel as is requisite for sufficient slack in advance of the wheel at *d* to enable the planks to lie flat on the ground before the wheel rolls on them. To secure the track on the wheel-rim, I provide each plate with prongs *e*, which straddle the rim *c* and thereby keep said track in place, said prongs being of such length that they will not escape from the rim at the slack *d*, the prongs *e* being inclined outward from base to point to both edges of the track, affording play or adjustment of the track-plates on sloping ground, as indicated in Fig. 2. It will thus be seen that the track will be properly retained on the wheel-rim, to be carried along by it and laid on the ground, and will at the same time have sufficient play in its connection with the wheel for the respective planks to take whatever position may be required on ground of ordinary uniformity of surface.

I propose to connect one of the joints of the endless track by removable or detachable devices of any approved kind, enabling the track to be disconnected for ready application to and removal from the rim of the wheel as may be required for putting on the track when the ground is soft and taking it off when the ground is dry and hard.

Having thus fully described my invention, I claim as new and desire to secure by Letters Patent—

1. The combination of an endless track of jointed plates or planks *a*, having prongs *e*, with a wagon or other vehicle wheel, substantially as described.

2. The combination, with a vehicle-wheel, of an endless track of jointed plates or planks *a*, having prongs *e*, inclining from base to point toward the side edges of the plates, substantially as and for the purposes set forth.

OLIVER F. GILBERT.

Witnesses:
M. B. DELAND,
C. P. HESS.